(12) United States Patent
Chiang et al.

(10) Patent No.: US 8,231,236 B2
(45) Date of Patent: Jul. 31, 2012

(54) INPUT APPARATUS AND LIGHT GUIDING PLATE THEREOF

(75) Inventors: Chih-Hsiang Chiang, Zhongli (TW); Chih-Chung Yen, Bade (TW); Liang-Ta Yeh, Shulin (TW)

(73) Assignee: Dafron Electronics Corp., Gueishan, Taoyuan (TW)

( * ) Notice: Subject to any disclaimer, the term of this patent is extended or adjusted under 35 U.S.C. 154(b) by 398 days.

(21) Appl. No.: 12/575,290

(22) Filed: Oct. 7, 2009

(65) Prior Publication Data

US 2010/0089731 A1    Apr. 15, 2010

(30) Foreign Application Priority Data

Oct. 9, 2008  (TW) .................................. 97218181 U

(51) Int. Cl.
  *H01H 9/00*  (2006.01)
  *F21V 11/00*  (2006.01)
  *G01D 11/28*  (2006.01)

(52) U.S. Cl. ................ 362/23; 362/24; 362/29; 362/30; 362/615; 200/314

(58) Field of Classification Search ..................... 362/24, 362/29, 30, 86, 88, 612, 624, 627, 629, 23; 200/314

See application file for complete search history.

(56) References Cited

U.S. PATENT DOCUMENTS

| | | | |
|---|---|---|---|
| 7,534,001 B2 * | 5/2009 | Liu ................................. | 362/24 |
| 7,572,023 B2 * | 8/2009 | Chen .............................. | 362/26 |
| 7,651,231 B2 * | 1/2010 | Chou et al. ..................... | 362/85 |
| 7,786,394 B2 * | 8/2010 | Gao et al. ...................... | 200/314 |
| 2003/0203219 A1 * | 10/2003 | Lin et al. ....................... | 428/457 |
| 2009/0173606 A1 * | 7/2009 | Liao et al. ..................... | 200/310 |
| 2010/0147661 A1 * | 6/2010 | Takeda .......................... | 200/314 |

* cited by examiner

*Primary Examiner* — Stephen F Husar
*Assistant Examiner* — James Cranson, Jr.
(74) *Attorney, Agent, or Firm* — Winson Hsu; Scott Margo

(57) ABSTRACT

The invention provides a light guiding plate. The light guiding plate is transparent and applied to an input apparatus. A surface of the light guiding plate comprises a first region and a second region. The first region is covered by a non-transparent material. If a light is emitted into the light guiding plate, the light can be emitted out from the second region.

19 Claims, 5 Drawing Sheets

INPUT APPARATUS AND LIGHT GUIDING PLATE THEREOF

BACKGROUND OF THE INVENTION

1. Field of the Invention

The invention relates to a light guiding plate, and more particularly, to a specially designed light guiding plate and an input apparatus including the light guiding plate.

2. Description of the Prior Art

With the developing of the technology, the information equipment has also become popular. Taking the most-used computer for example, there are various kinds of computers on the market, and they are used in every place, such as a home, a factory, an office, and a school, and almost become a necessary apparatus in our daily life. A well-known computer, no matter a desktop computer or a notebook, needs a keyboard for a user to input words.

At present, there is a kind of lighting keyboard shown on the market. Since the lighting keyboard has the lighting function that the conventional keyboard lacks of, therefore, the lighting keyboard can widely attract the attentions of the consumers and become popular. Please refer to FIG. 1. FIG. 1 shows an appearance view of an ordinary lighting keyboard. As shown in FIG. 1, the lighting keyboard 1 includes a plurality of keyswitches 10, a metal plate 12, and a lighting module 14. The light emitted from the lighting module 14 is transmitted into the keyswitch 10 through a through hole 122 on the metal plate 12, and then the light can be emitted out of the keyswitch 10 via a transparent key cap 102 of the keyswitch 10 to achieve the lighting effect of the keyswitch 10.

Please refer to FIG. 2. FIG. 2 shows a scheme diagram of the detailed structure of the lighting module 14 shown in FIG. 1. As shown in FIG. 2, the lighting module 14 includes a soft circuit board 141, lighting units 142, a light guiding plate 143, a reflecting layer 144, and a shielding layer 145. Wherein, the reflecting layer 144 and the shielding layer 145 are set under and above the light guiding plate 143 respectively.

The lighting units 142 set on the soft circuit board 141 pass through the reflecting layer 144 and extend into the light guiding plate 143. When the lighting units 142 emits lights, since the reflecting layer 144 and the shielding layer 145 are not transparent, so that the lights can be emitted out of the light guiding plate 143 only through a first transparent region 1452 and a second transparent region 1454 on the shielding layer 145, and then the lights are emitted into the keyswitch 10 via the through hole 122 on the metal plate 12.

However, since the shielding layer 145 and the reflecting layer 144 are necessary to be set under and above the light guiding plate 143, the manufacturing process of the lighting keyboard 1 will become more complicated and the production efficiency will be also reduced, and the production cost of the lighting keyboard 1 will be also increased at the same time. Additionally, it is also possible that the lights entering into the light guiding plate 143 are emitted out of the light guiding plate 143 from the side surface of the light guiding plate 143, and the light intensity provided to the lighting keyboard 1 will be decreased accordingly.

Therefore, the invention provides a specially designed light guiding plate and an input apparatus including the light guiding plate to solve the above-mentioned problems.

SUMMARY OF THE INVENTION

The invention provides a specially designed light guiding plate and an input apparatus including the light guiding plate. In fact, the input apparatus can be a lighting keyboard used to operate a desktop computer, a notebook, or other electronic equipments.

With the specially designed light guiding plate of this invention, the complicated structure and manufacturing process of the conventional lighting keyboard can be largely simplified, and the light guiding efficiency of the light guiding plate can be also effectively increased, so that the light intensity provided to the lighting keyboard will not be decreased.

A first embodiment of the invention is a light guiding plate. In fact, the light guiding plate is transparent and applied to the structure of the lighting keyboard. In this embodiment, a first surface of the light guiding plate includes a first region and a second region. The first region and the second region are not overlapped. The first region is covered by a non-transparent material. If the lights are emitted into the light guiding plate, the lights can emitted out of the light guiding plate from the second region on the first surface.

In practical applications, the non-transparent material can cover the first region in a spray coating way or an attaching way. The non-transparent material can be PVC.

In this embodiment, the light guiding plate can further include a second surface opposite to the first surface. When a specific region on the second surface is covered by the non-transparent material, the lights can not be emitted out from the specific region on the second surface.

In addition, the light guiding plate can also include at least one side surface adjacent to the first surface. When a specific region on the at least one side surface is covered by the non-transparent material, the lights can not be emitted from the specific region.

A second embodiment of the invention is an input apparatus. In fact, the input apparatus can be a lighting keyboard used to operate a desktop computer, a notebook, or other electronic equipments. The input apparatus includes lighting units, a light guiding plate, and a keyswitch module. The lighting units are used to emit lights. The light guiding plate is transparent and set on the lighting units; the keyswitch module is set on light guiding plate. The keyswitch module includes a plurality of key caps, wherein each key cap has a transparent region. Therefore, when the light is emitted to the key cap, the light can be emitted out from the transparent region.

In this embodiment, a first surface of the light guiding plate includes a first region and a second region. The first region and the second region are not overlapped. The first region is covered by a non-transparent material. If the lights are emitted into the light guiding plate, the lights can be emitted out of the light guiding plate from the second region on the first surface.

In practical applications, the non-transparent material can cover the first region in a spray coating way or an attach way. The non-transparent material can be PVC.

In this embodiment, the light guiding plate can include a second surface opposite to the first surface. When a specific region on the second surface is covered by the non-transparent material, the lights can not be emitted from the specific region. In addition, the light guiding plate can also include at least one side surface adjacent to the first surface. When a specific region on the at least one side surface is covered by the non-transparent material, the lights can not be emitted from the specific region on the second surface.

Compared to the prior arts, according to the special design of the light guiding plate in this invention, the light guiding plate itself can provide the functions of the shielding layer and reflecting layer originally set above and under the light guiding plate in prior arts. Therefore, the lighting keyboard including the light guiding plate can not only simplify the complicated process of the conventional lighting keyboard and increase the production efficiency of the lighting keyboard by removing the processes of manufacturing the shielding layer and reflecting layer, but also increase the light guiding efficiency of the light guiding plate to enhance the light intensity of the lighting keyboard.

The objective of the present invention will no doubt become obvious to those of ordinary skill in the art after reading the following detailed description of the preferred embodiment, which is illustrated in the various figures and drawings.

BRIEF DESCRIPTION OF THE APPENDED DRAWINGS

Figure 7:
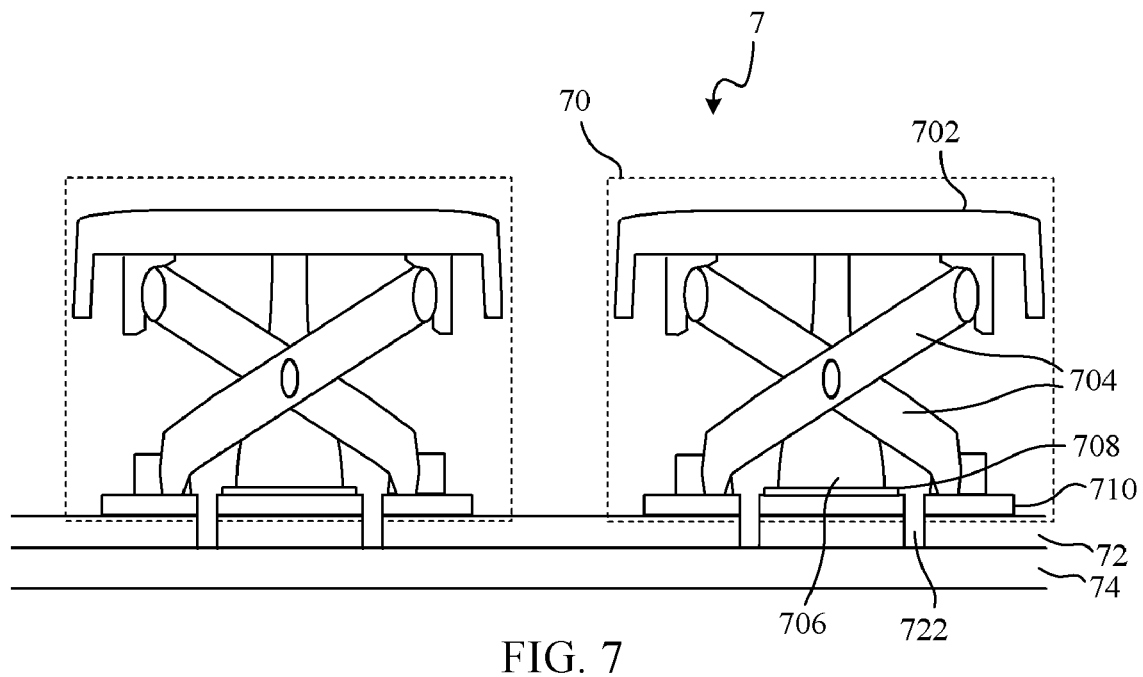
FIG. 7 shows a scheme diagram of the input apparatus according to the second embodiment of the invention.
Figure 8A:
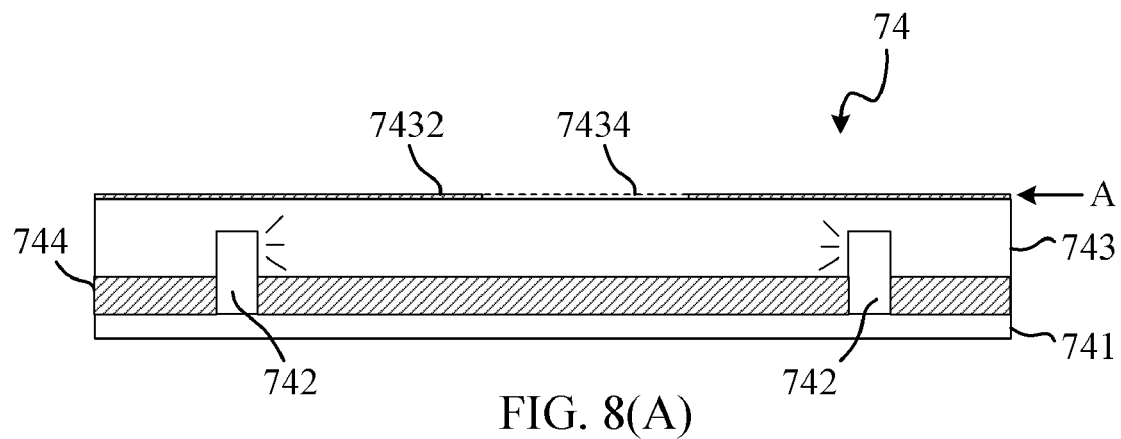
Figure 8B:
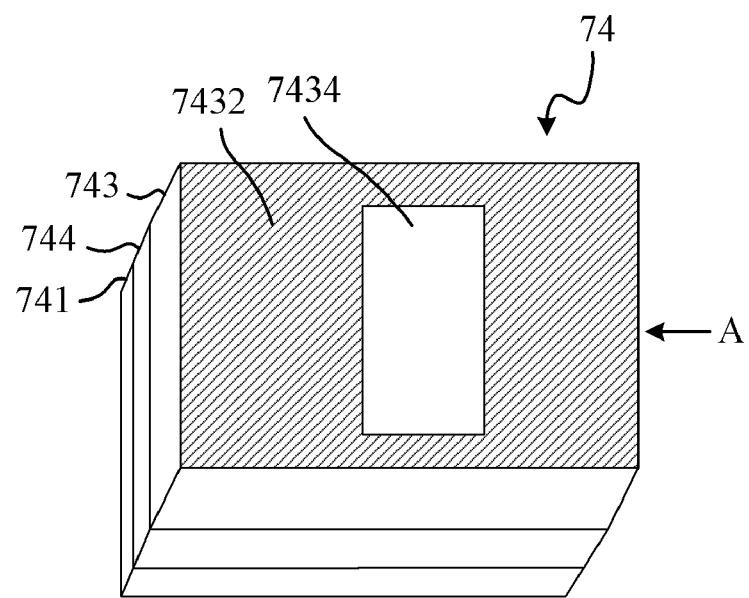

FIG. 8(A) and FIG. 8(B) show a cross-sectional view and an appearance view of the detailed structure of the lighting module shown in FIG. 7 respectively.

Figure 9A:
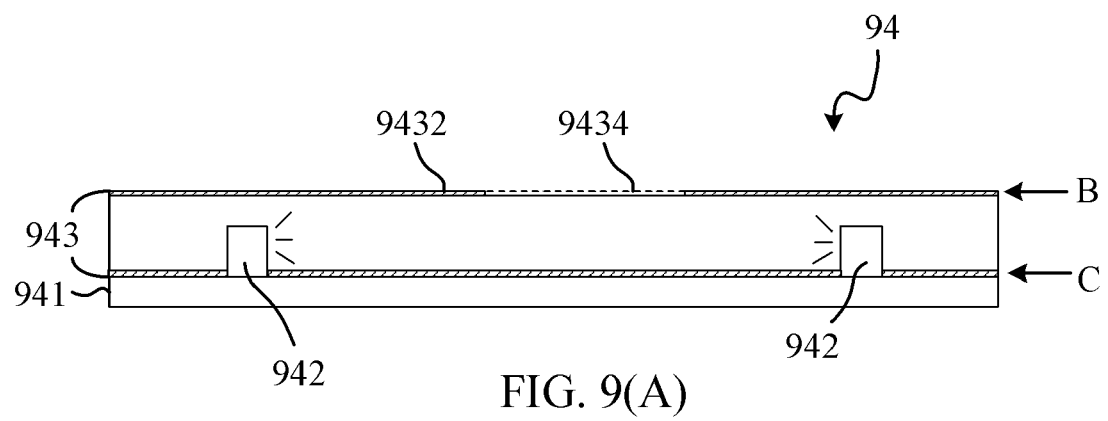

FIG. 9(A) shows a cross-sectional view of the detailed structure of the lighting module.

Figure 9B:
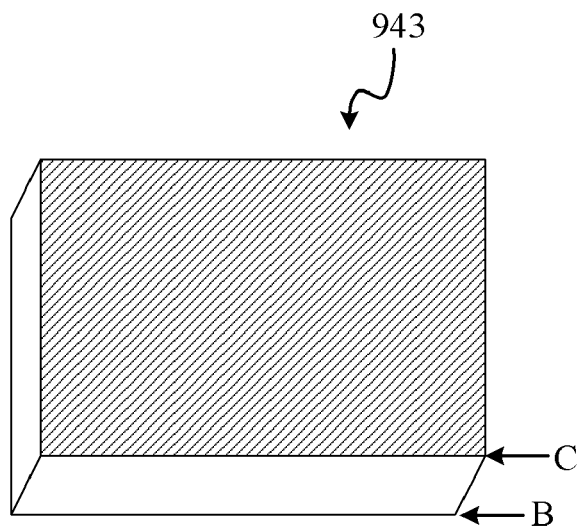

FIG. 9(B) shows a scheme diagram of the lower surface of the light guiding plate being covered by the non-transparent material.

Figure 10:
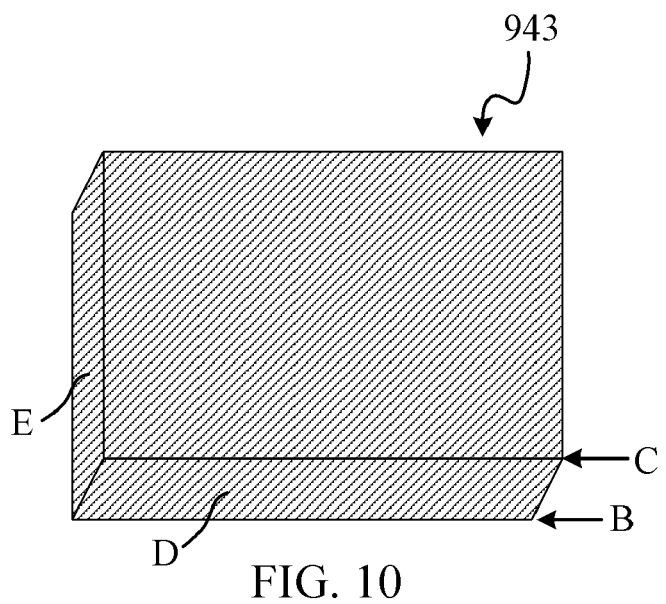

FIG. 10 shows a scheme diagram of the first side surface and the second side surface of the light guiding plate being covered by the non-transparent material.

DETAILED DESCRIPTION OF THE INVENTION

The invention provides a specially designed light guiding plate and an input apparatus including the light guiding plate. In fact, the input apparatus can be a lighting keyboard used to operate a desktop computer, a notebook, or other electronic equipments.

With the specially designed light guiding plate of this invention, the complicated structure and manufacturing process of the conventional lighting keyboard can be largely simplified, and the light guiding efficiency of the light guiding plate can be also effectively increased, so that the light intensity provided to the lighting keyboard will not be decreased.

Figure 3:
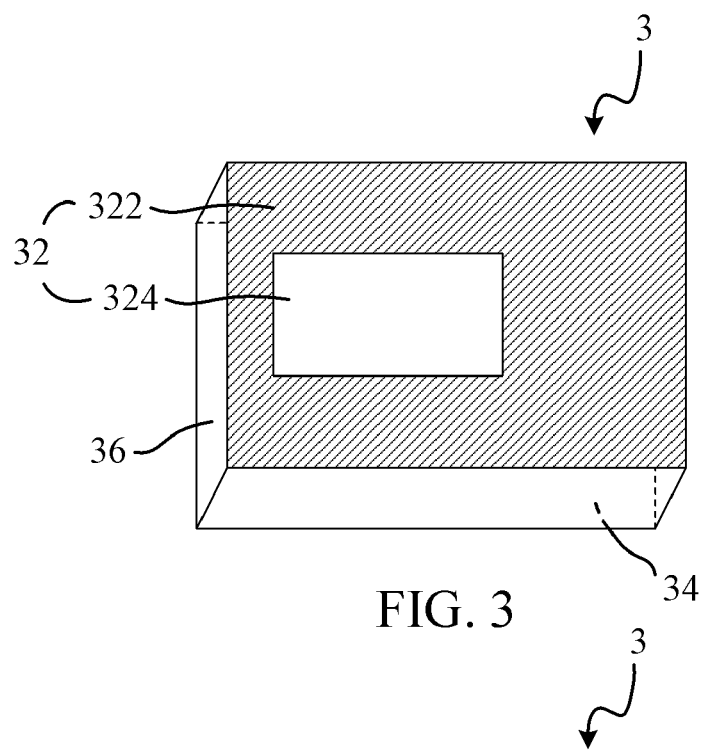
FIG. 3 shows a scheme diagram of the light guiding plate according to the first embodiment of the invention.

A first embodiment of the invention is a light guiding plate. In fact, the light guiding plate can be integrated into the structure of a lighting keyboard. In this embodiment, the light guiding plate is made of a transparent material. Please refer to FIG. 3. FIG. 3 shows a scheme diagram of the light guiding plate 3.

As shown in FIG. 3, the light guiding plate 3 includes an upper surface 32, a lower surface 34, and a side surface 36. Then, the upper surface 32 of the light guiding plate 3 will be introduced. The upper surface 32 includes two regions. These two regions are a non-transparent region 322 and a transparent region 324 respectively. The non-transparent region 322 and the transparent region 324 are not overlapped.

In this embodiment, there is a layer of non-transparent material covering the non-transparent region 322; on the contrary, there is no non-transparent material covering the transparent region 324.

In practical applications, the non-transparent material can be PVC or other light-proof materials. In addition, the non-transparent material can cover the non-transparent region 322 in different ways.

For example, the non-transparent material can be formed on the non-transparent region 322 in a spread coating way; the non-transparent material can be also formed on the non-transparent region 322 in an attaching way or a smearing way.

Then, the condition of the light being emitted into the light guiding plate 3 will be discussed. When the light is emitted into the light guiding plate 3 from the lower surface 34 of the light guiding plate 3, since the non-transparent region 322 of the upper surface 32 on the light guiding plate 3 is covered by a layer of non-transparent material, therefore, when the light is emitted to the upper surface 32, the layer of non-transparent material will block the light, so that the light can not be emitted out of the light guiding plate 3 from the non-transparent region 322.

Additionally, since there is no non-transparent material covering the transparent region 324, the light can be emitted out of the light guiding plate 3 from the transparent region 324 to provide the light source for the keyswitches of the lighting keyboard.

Figure 1:
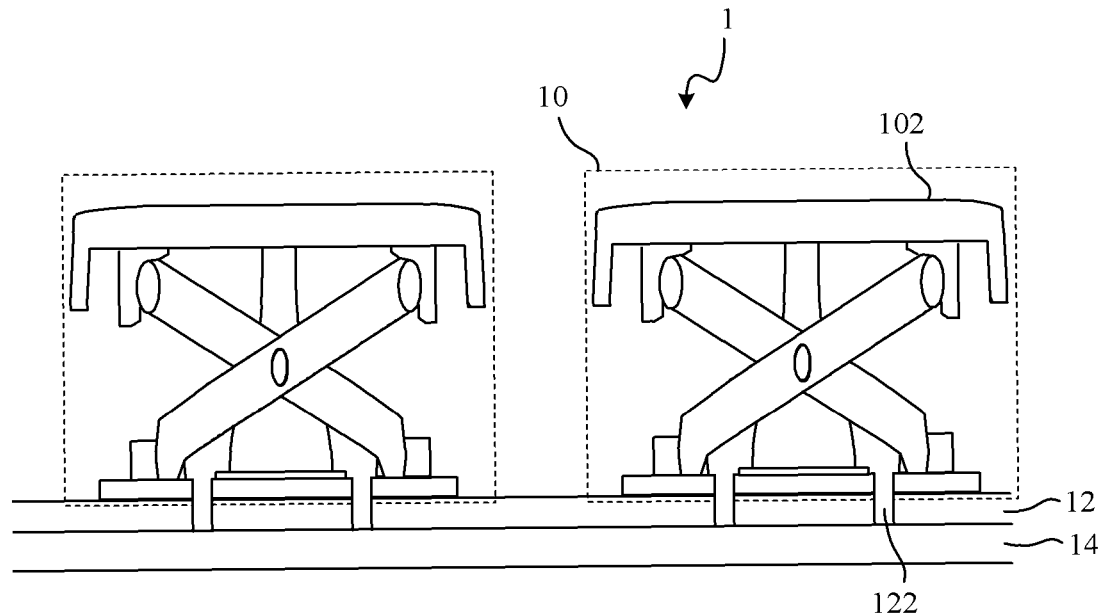
FIG. 1 shows a scheme diagram of the lighting keyboard in the prior art.
Figure 2:
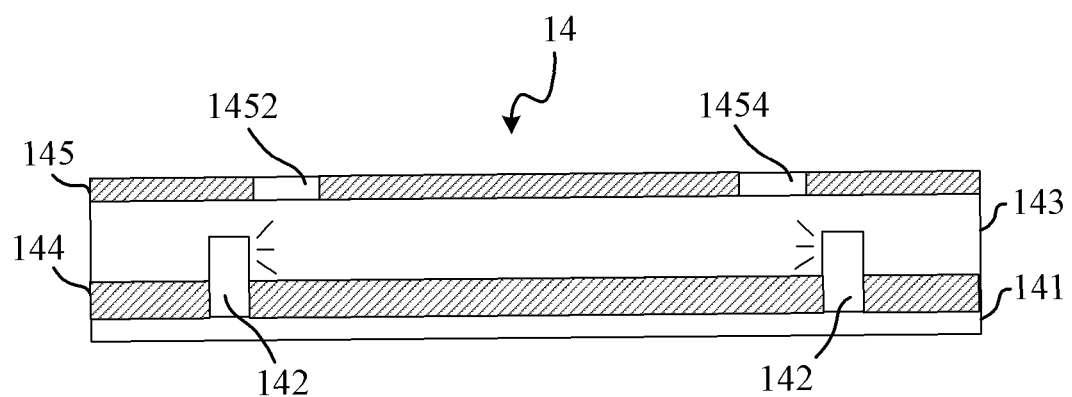
FIG. 2 shows a scheme diagram of the detailed structure of the lighting keyboard shown in FIG. 1.

In the conventional structure of the lighting keyboard, there is usually a shielding layer set above the light guiding plate, as shown in FIG. 2. With the design of the light guiding plate mentioned above, since the light guiding plate already has the function provided by the shielding layer, therefore, the shielding layer in the structure of the lighting keyboard can be omitted, so that the space of the structure of the lighting keyboard can be saved and the complicated manufacturing process of the lighting keyboard can be also simplified.

Figure 4:
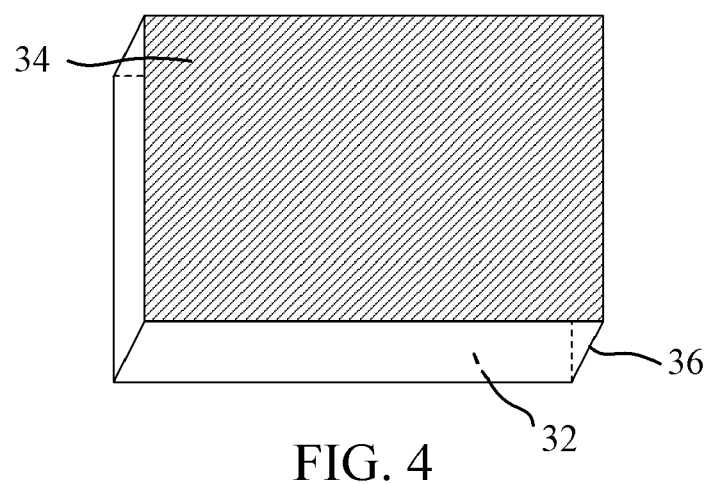
FIG. 4 shows a scheme diagram of the lower surface of the light guiding plate being covered by the non-transparent material.

Next, the lower surface 34 of the light guiding plate 3 will be introduced. As shown in FIG. 4, the lower surface 34 of the light guiding plate 3 is covered by a layer of non-transparent material. In practical applications, the layer of the non-transparent material can be PVC or other light-proof materials.

In addition, the non-transparent material can cover the lower surface 34 in different ways. For example, the non-transparent material can be formed on the lower surface 34 in a spread coating way, an attaching way, or a smearing way. And, the region covered by the non-transparent material can be the entire lower surface 34 or only a part of the lower surface 34, it is not limited to this case.

In this embodiment, the reason why the lower surface 34 of the light guiding plate 3 is covered by the non-transparent material is to prevent the lights in the light guiding plate 3 from being emitted out from the lower surface 34. When the lights are emitted into the light guiding plate 3 from the lower surface 34 of the light guiding plate 3, the lights will be transmitted in the light guiding plate 3. When the lights in the light guiding plate 3 want to be emitted out of the light guiding plate 3 from the lower surface 34, the lights will be reflected by the non-transparent material covering the lower surface 34, so that the lights can not be emitted out of the light guiding plate 3 from the lower surface 34, and the light intensity provided to the lighting keyboard will not be reduced.

In the conventional structure of the lighting keyboard, there is usually a reflecting layer set under the light guiding plate, as shown in FIG. 2. With the design of the light guiding plate 3 mentioned above, since the light guiding plate already has the function provided by the reflecting layer, so the light guiding efficiency of the light guiding plate will be increased to enhance the light intensity of the lighting keyboard. Therefore, the reflecting layer in the structure of the lighting keyboard can be omitted, so that the space of the structure of the lighting keyboard can be saved and the complicated manufacturing process of the lighting keyboard can be also simplified.

Figure 5:
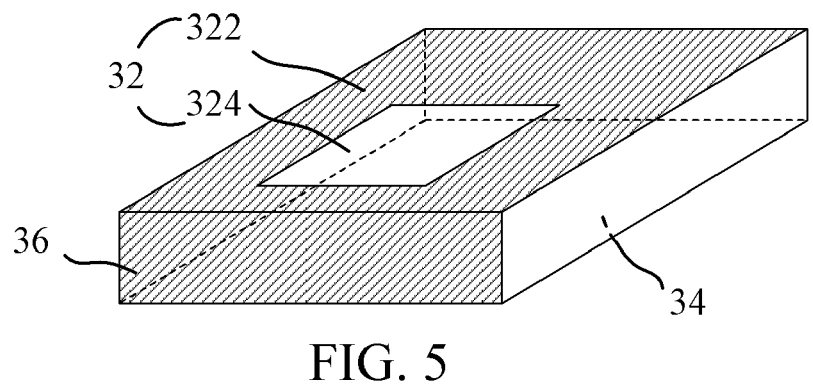
FIG. 5 shows a scheme diagram of the side surface of the light guiding plate shown in FIG. 4 being covered by the non-transparent material.

Then, the side surface 36 of the light guiding plate 3 will be introduced. As shown in FIG. 5, the side surface 36 of the light guiding plate 3 is covered by a layer of non-transparent material. In practical applications, the layer of non-transparent material can be PVC or other light-proof materials.

In addition, the non-transparent material can cover the side surface 36 in different ways. For example, the non-transparent material can be formed on the side surface 36 in a spread coating way, an attaching way, or a smearing way.

In this embodiment, the reason why the side surface 36 of the light guiding plate 3 is covered by the non-transparent material is to prevent the lights in the light guiding plate 3 from being emitted out from the side surface 36. When the lights are emitted into the light guiding plate 3 from the lower surface 34 of the light guiding plate 3, the lights will be transmitted in the light guiding plate 3.

When the lights in the light guiding plate 3 wants to be emitted from the side surface 36, the lights will be reflected by the non-transparent material covering the side surface 36, so that the lights can not be emitted out of the light guiding plate 3 from the side surface 36, and the light intensity provided to the lighting keyboard will not be reduced.

It should be noticed that not only the side surface 36 of the light guiding plate 3, but also the other side surfaces of the light guiding plate 3 can be covered by the non-transparent material, so that the lights in the light guiding plate 3 will not be emitted from the side surfaces to prevent that the light intensity provided to the lighting keyboard is reduced. Additionally, the region covered by the non-transparent material can be the entire side surface or only a part of the side surface, not limited to this case.

Figure 6:
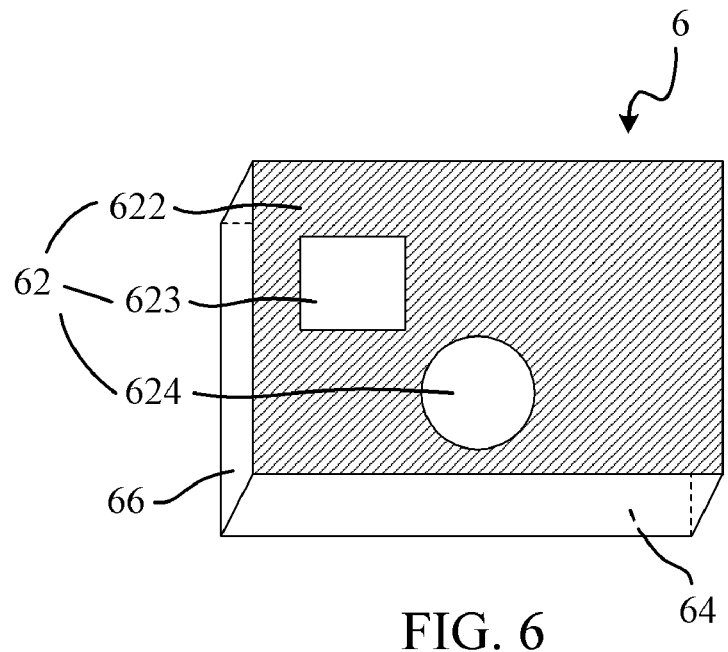
FIG. 6 shows a scheme diagram of the upper surface of the light guiding plate including two transparent regions in different forms.

Please refer to FIG. 6. FIG. 6 shows a scheme diagram of the upper surface of the light guiding plate including two transparent regions in different forms. As shown in FIG. 6, the light guiding plate 6 includes an upper surface 62, a lower surface 64, and a side surface 66. The upper surface 62 of the light guiding plate 6 includes a non-transparent region 622, a first transparent region 623, and a second transparent region 624. Wherein, the form of the first transparent region 623 is a square, and the form of the second transparent region 624 is a circle, obviously, they are not the same.

In fact, no matter the transparent region or the non-transparent region, their forms or sizes can be adjusted based on the practical needs, not limited by the embodiments in the invention.

A second embodiment of the invention is an input apparatus. In fact, the input apparatus can be a lighting keyboard used to operate a desktop computer, a notebook, or other electronic equipments. Please refer to FIG. 7. FIG. 7 shows a scheme diagram of the input apparatus.

As shown in FIG. 7, the input apparatus 7 includes a plurality of keyswitches 70, a metal plate 72, and a lighting module 74. Wherein, the keyswitch 70 includes a key cap 702, a scissors structure 704, a rubber dome 706, a soft circuit board 708, and a substrate 710. The key cap 702 is transparent. The lights emitted by the lighting module 74 can be transmitted into the keyswitch 70 via a through hole 722 on the metal plate 72, and the lights will be emitted out of the keyswitch 70 via the transparent key cap 702 of the keyswitch 70 to achieve the lighting effect of the keyswitch 70.

In this embodiment, when the keyswitch 70 is pressed by an external force, the key cap 702 will move downward to change the form of the rubber dome 706, so that the contact end set in the rubber dome 706 can contact with the switch on the soft circuit board 708 to make the switch is conducted.

In practical applications, whether the switch on the soft circuit board 708 contacts with the contact end of the rubber dome 706 can achieve the function of inputting words or other functions. As to the scissors structure 704, the scissors structure 704 is used to help the keyswitch 70 go back to its original position quickly when the external force pressing the keyswitch 70. Since the structure of the keyswitch 70 is similar with the original keyswitch, therefore, it is simply described as mentioned above.

Then, the lighting module 74 of the input apparatus 7 will be introduced in detail. Please refer to FIG. 8(A) and FIG. 8(B). FIG. 8(A) and FIG. 8(B) show a cross-sectional view and an appearance view of the detailed structure of the lighting module 74 respectively.

As shown in FIG. 8(A), the lighting module 74 includes a soft circuit plate 741, lighting units 742, a light guiding plate 743, and a reflecting layer 744. Wherein, the reflecting layer 744 is set under the light guiding plate 743. It should be noticed that compared to the lighting module 14 shown in FIG. 2, the lighting module 74 omits the shielding layer 145 of the lighting module 14.

In this embodiment, an upper surface A of the light guiding plate 743 includes a non-transparent region 7432 and a transparent region 7434. And, the non-transparent region 7432 and the transparent region 7434 are not overlapped. The non-transparent region 7432 is covered by a layer of non-transparent material; on the contrary, the transparent region 7434 is not covered by any non-transparent materials.

In practical applications, the non-transparent material can be PVC or other light-proof materials. In addition, the non-transparent material can cover the non-transparent region 7432 in different ways. For example, the non-transparent material can be formed on the non-transparent region 7432 in a spread coating way, an attaching way, or a smearing way.

Next, the condition of the light being emitted into the light guiding plate 743 will be introduced. When the light is emitted into the light guiding plate 743 from the lower surface of the light guiding plate 743, since the non-transparent region 7432 of the upper surface A on the light guiding plate 743 is covered by a layer of non-transparent material, so when the light is emitted to the upper surface A, the layer of non-transparent material will block the light and the light can not emit out from the non-transparent region 7432.

Additionally, since there is no non-transparent material covering the transparent region 7434, so that the light can be emitted out of the light guiding plate 743 to provide the light source of the keyswitches of the lighting keyboard.

With the design of the light guiding plate 743 mentioned above, since the light guiding plate 743 already has the function originally provided by the shielding layer, therefore, the shielding layer of the conventional structure of the lighting keyboard can be omitted to save the space of the structure of the lighting keyboard and to simplify the complicated manufacturing process of the lighting keyboard.

In fact, not only the upper surface of the light guiding plate, but also the lower surface of the light guiding plate can be performed by similar process. Please refer to FIG. 9(A), FIG. 9(A) shows a cross-sectional view of the detailed structure of the lighting module 94.

As shown in FIG. 9(A), the lighting module 94 includes a soft circuit board 941, lighting units 942, and a light guiding plate 943. An upper surface B and a lower surface C of the light guiding plate 943 are both covered by a non-transparent material. It should be noticed that compare to the lighting module 14 shown in FIG. 2, the lighting module 94 omits the shielding layer 145 and the reflecting layer 144 of the lighting module 14.

As shown in FIG. 9(B), the lower surface C of the light guiding plate 943 is covered by a layer of non-transparent material. In fact, the non-transparent material can be PVC or other light-proof materials. In addition, the non-transparent material can cover the lower surface C in different ways. For example, the non-transparent material can be formed on the lower surface C in a spread coating way, an attaching way, or a smearing way.

In this embodiment, the reason why the lower surface C of the light guiding plate 943 is covered by the non-transparent material is to prevent the lights in the light guiding plate 943 from being emitted out from the lower surface C. When the lights are emitted into the light guiding plate 943 from the lower surface C of the light guiding plate 943, the lights will be transmitted in the light guiding plate 943. When the lights in the light guiding plate 943 wants to be emitted from the lower surface C, the lights will be reflected by the non-transparent material covering the lower surface C, so that the lights can not be emitted out of the light guiding plate 943 from the lower surface C, and the light intensity provided to the lighting keyboard will not be reduced.

Since the light guiding plate 943 already has the function provided by the reflecting layer, the light guiding efficiency of the light guiding plate 943 will be increased to enhance the light intensity of the lighting keyboard. Therefore, the reflecting layer in the structure of the lighting keyboard can be omitted, so that the space of the structure of the lighting keyboard can be saved and the complicated manufacturing process of the lighting keyboard can be also simplified.

Similarly, as shown in FIG. 10, a first side surface D and a second side surface E of the light guiding plate 943 can be also covered by the non-transparent material. The reason why the first side surface D and the second side surface E of the light guiding plate 943 are covered by the non-transparent material is to prevent the lights in the light guiding plate 943 from being emitted out from the 1 first side surface D and the second side surface E.

In fact, not only the first side surface D and the second side surface E, but also the other side surfaces of the light guiding plate 943 can be also covered by the non-transparent material to prevent the lights being emitted from the side surfaces of the light guiding plate 943, so that the light intensity provided to the lighting keyboard will not be reduced.

Compared to the prior arts, according to the special design of the light guiding plate in this invention, the light guiding plate itself can provide the functions of the shielding layer and reflecting layer originally set above and under the light guiding plate in prior arts. Therefore, the lighting keyboard including the light guiding plate can not only simplify the complicated process of the conventional lighting keyboard and increase the production efficiency of the lighting keyboard by removing the processes of manufacturing the shielding layer and reflecting layer, but also increase the light guiding efficiency of the light guiding plate to enhance the light intensity of the lighting keyboard.

Although the present invention has been illustrated and described with reference to the preferred embodiment thereof, it should be understood that it is in no way limited to the details of such embodiment but is capable of numerous modifications within the scope of the appended claims.

What is claimed is:

1. A light guiding plate, the light guiding plate being transparent and applied to an input apparatus, the light guiding plate comprising:
   a first surface, comprising:
      a first region, the first region being covered by a non-transparent material; and
      a second region, the second region being different from the first region, if a light is emitted into the light guiding plate, the light can emit out of the light guiding plate from the second region; and
   a second surface, the second surface being opposite to the first surface, wherein when a specific region of the second surface is covered by the non-transparent material, and the light can not be emitted out of the light guiding plate from the specific region.

2. The light guiding plate of claim 1, wherein the non-transparent material covering the first region blocks the light from being emitted out of the light guiding plate from the first region.

3. The light guiding plate of claim 1, wherein the first region and the second region are not overlapped.

4. The light guiding plate of claim 1, wherein the non-transparent material covers the first region in a spread coating way.

5. The light guiding plate of claim 1, wherein the non-transparent material covers the first region in a smearing way.

6. The light guiding plate of claim 1, wherein the non-transparent material covers the first region in an attaching way.

7. The light guiding plate of claim 1, wherein the non-transparent material is PVC.

8. The light guiding plate of claim 1, further comprising:
   at least one side surface, the at least one side surface being adjacent to the first surface, when a specific region of the at least one side surface is covered by the non-transparent material, the light can not be emitted out of the light guiding plate from the specific region.

9. An input apparatus, comprising:
   a lighting unit, for emitting a light;
   a light guiding plate, set on the lighting unit, the light guiding plate being transparent, a first surface of the light guiding plate comprising:
      a first region, the first region being covered by a non-transparent material; and
      a second region, when the light is emitted into the light guiding plate, the light can be emitted out of the light guiding plate from the second region; and
   a keyswitch module, the keyswitch module being set on the light guiding plate, and the keyswitch module comprising a plurality of key caps, each of the plurality of key caps comprising a transparent region, wherein when the light is emitted to the plurality of key caps, the light can be emitted out from the transparent region.

10. The input apparatus of claim 9, wherein the input apparatus is a lighting keyboard.

11. The input apparatus of claim 9, wherein the lighting unit is a light emitting diode (LED) device.

12. The input apparatus of claim 9, wherein the non-transparent material covering the first region blocks the light from being emitted out of the light guiding plate from the first region.

13. The input apparatus of claim 9, wherein the first region and the second region are not overlapped.

14. The input apparatus of claim 9, wherein the non-transparent material covers the first region in a spread coating way.

15. The input apparatus of claim 9, wherein the non-transparent material covers the first region in a smearing way.

16. The input apparatus of claim 9, wherein the non-transparent material covers the first region in an attaching way.

17. The input apparatus of claim 9, wherein the non-transparent material is PVC.

18. The input apparatus of claim 9, wherein the light guiding plate further comprises:

a second surface, the second surface is opposite to the first surface, when a specific region of the second surface is covered by the non-transparent material, the light can not be emitted out of the light guiding plate from the specific region.

19. The input apparatus of claim 9, wherein the light guiding module further comprises:

at least one side surface, the at least one side surface is adjacent to the first surface, when a specific region of the at least one side surface is covered by the non-transparent material, the light can not be emitted out of the light guiding plate from the specific region.

* * * * *

UNITED STATES PATENT AND TRADEMARK OFFICE
CERTIFICATE OF CORRECTION

PATENT NO. : 8,231,236 B2  Page 1 of 1
APPLICATION NO. : 12/575290
DATED : July 31, 2012
INVENTOR(S) : Chih-Hsiang Chiang et al.

It is certified that error appears in the above-identified patent and that said Letters Patent is hereby corrected as shown below:

On the title page, item (73), correct the name of the assignee from "Dafron Electronics Corp." to --Darfon Electronics Corp.--.

Signed and Sealed this
Twenty-third Day of October, 2012

David J. Kappos
*Director of the United States Patent and Trademark Office*